United States Patent
Fukuda et al.

(10) Patent No.: US 6,775,981 B2
(45) Date of Patent: Aug. 17, 2004

(54) ENGINE OPERATED MACHINE SYSTEM

(75) Inventors: Taro Fukuda, Wako (JP); Kazuhiro Togawa, Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 10/326,278

(22) Filed: Dec. 23, 2002

(65) Prior Publication Data

US 2003/0140631 A1 Jul. 31, 2003

(30) Foreign Application Priority Data

Dec. 28, 2001 (JP) ........................................ 2001-401385
Dec. 28, 2001 (JP) ........................................ 2001-401386

(51) Int. Cl.[7] ............................ F02G 5/04; F02G 63/04
(52) U.S. Cl. ......................... 60/597; 123/2; 123/41.14; 237/12.1
(58) Field of Search .......................... 60/597, 614, 616; 123/2, 41.14; 290/1 A, 1 B; 237/2 B, 12.1; F01B 7/08, 1/06; F02B 63/04; F02G 5/04

(56) References Cited

U.S. PATENT DOCUMENTS

| | | | | |
|---|---|---|---|---|
| 4,226,214 A | * | 10/1980 | Palazzetti | 123/2 |
| 4,911,110 A | * | 3/1990 | Isoda et al. | 123/41.14 |
| 4,951,871 A | * | 8/1990 | Hata et al. | 237/12.1 |
| 6,367,260 B1 | * | 4/2002 | Kasai et al. | 60/597 |

FOREIGN PATENT DOCUMENTS

| | | | | |
|---|---|---|---|---|
| JP | 02099750 A | * | 4/1990 | F02G/5/04 |
| JP | 04209922 A | * | 7/1992 | F01P/5/06 |
| JP | 7-46741 | | 10/1995 | |
| JP | 10131762 A | * | 5/1998 | F02B/63/04 |
| JP | 10141088 A | * | 5/1999 | F02B/63/04 |
| JP | 11200951 A | * | 7/1999 | F02B/63/04 |
| JP | 2001020740 A | * | 1/2001 | F02B/63/04 |
| JP | 2001-132564 | | 5/2001 | |
| JP | 2003120315 A | * | 4/2003 | F02B/63/04 |

* cited by examiner

Primary Examiner—Thomas Denion
Assistant Examiner—Thai-Ba Trieu
(74) Attorney, Agent, or Firm—Arent Fox PLLC

(57) ABSTRACT

An engine operated machine system includes an engine, a working machine driven by the engine, and a waste-heat recovery unit for recovering the waste heat of the engine, each being accommodated in a box-shaped case. The case is provided with a partition wall which partitions the inside of the case into working-machine accommodating and electrical-equipment accommodating chambers, and which has a draft bore connecting the working-machine accommodating chamber to the electrical-equipment accommodating chamber. The case is also provided with a cooling-air intake port connecting the electrical-equipment accommodating chamber to the outside, a discharge port forcibly discharging, to the outside, air discharged from the working-machine accommodating chamber by an engine-driven fan, and an assist fan disposed in the draft bore and adapted to be operated, in response to the temperature in the working-machine accommodating chamber exceeding a predetermined value, to feed the air in the electrical-equipment accommodating chamber into the working-machine accommodating chamber.

10 Claims, 5 Drawing Sheets

ENGINE OPERATED MACHINE SYSTEM

BACKGROUND OF THE INVENTION

1. Field of the Invention

The present invention relates to an engine operated machine system including an engine and a working machine driven by the engine, which are accommodated in a box-shaped case. In particular, the present invention relates to an improvement in an engine operated machine system suitable for a case where a waste-heat recovery unit for recovering the waste heat of the engine is accommodated in a case, as in a cogeneration system.

2. Description of the Related Art

In solving environmental problems, recovery and utilization of waste heat discharged from an engine by a cogeneration system and the like has recently attracted public attention. In an engine operated machine system including a waste-heat recovery unit, such as a cogeneration system, all devices that include an engine, a working machine, and a waste-heat recovery unit are completely covered by a box-shaped case in consideration of the operational noises emitted to the surrounding environment, as disclosed in, for example, Japanese Utility Model Publication No. 7-46741.

In the engine operated machine system disclosed in Japanese Utility Model Publication No. 7-46741, a ventilating fan and a ventilation port are provided in order to cool the devices within the case. In terms of recovering the waste heat discharged by the engine, the lowered temperature within the case leads to a heat loss, and energy needed to drive the ventilating fan results in an overall increase in energy consumption. In making the overall structure compact for accommodating the electrical equipment needed to control the engine and the working machine within the box-shaped case, the thermal influence from the engine and the working machine must be prevented from affecting the electrical equipment. However, Japanese Utility Model Publication No. 7-46741 does not disclose any such thermal influence preventing measures.

In contrast, the Applicants of the present invention have already achieved a cogeneration system, wherein the inside of a case is vertically divided into an upper chamber and a lower chamber to cut off the flow of air. An engine, a working machine, and a waste-heat recovery unit are accommodated in the lower chamber, while components, such as an electric control device needed to avoid the thermal influence from the engine and working machine, are accommodated in the upper chamber. As a result, waste heat from the engine is sufficiently recovered to enhance energy recovery efficiency, as disclosed in Japanese Patent Application Laid-open No. 2001-132564.

However, with the arrangement of the engine operated machine system disclosed in Japanese Patent Application Laid-open No. 2001-132564, it is difficult in some cases to appropriately maintain the temperature within the case. In addition, a partition wall is required to be disposed at a particular location in order to appropriately maintain the temperature within the case. In addition, the partition wall is disposed at a location closest to a high-temperature portion of the lower chamber. As a result, a feature to help avoid the influence of the heat transmitted to the upper chamber through the partition wall is required in response to conditions of temperature setting and the like.

SUMMARY OF THE INVENTION

It is an object of the present invention to overcome the above-described drawbacks of the Related Art.

It is also an object of the present invention to provide an engine operated machine system which easily prevents a thermal influence from affecting the components which must avoid the thermal influence in order to provide enhanced waste-heat recovery efficiency.

To achieve the above objects, there is provided an engine operated machine system including an engine, a working machine driven by the engine, and a waste-heat recovery unit for recovering the waste heat of the engine. The components of the engine operated machine system are accommodated in a box-shaped case. The box-shaped case is provided with a partition wall that partitions the inside of the case into a working-machine accommodating chamber that accommodates the engine, the working machine and the waste-heat recovery unit, and an electrical-equipment accommodating chamber. The partition wall has a draft bore which connects the working-machine accommodating chamber to the electrical-equipment accommodating chamber. The case is also provided with a cooling-air intake port connecting the electrical-equipment accommodating chamber to the outside or atmosphere, a discharge port for forcibly discharging, to the outside, air discharged from the working-machine accommodating chamber by a fan driven by the engine, and an assist fan disposed in the draft bore and adapted to be operated, in response to the temperature in the working-machine accommodating chamber exceeding a predetermined value, to feed the air in the electrical-equipment accommodating chamber into the working-machine accommodating chamber.

With the arrangement of the above-described feature, when the temperature in the working-machine accommodating chamber is equal to or lower than the predetermined value, the assist fan disposed in the draft bore is not operated and functions as a draft resistance. Thus, an excessive amount of air does not flow from the electrical-equipment accommodating chamber into the working-machine accommodating chamber, and the amount of the air forcibly discharged by the fan driven by the engine only flows from the electrical-equipment accommodating chamber into the working-machine accommodating chamber. Therefore, the temperature in the working-machine accommodating chamber is prevented from being lowered excessively, thereby enhancing the efficiency of recovery of the waste heat energy. Only when the temperature in the working-machine accommodating chamber exceeds the predetermined value does the assist fan feed the cooling air into the working-machine accommodating chamber, thereby preventing the temperature in the working-machine accommodating chamber from rising excessively. Moreover, the cooling air flows through the electrical-equipment accommodating chamber into the working-machine accommodating chamber, that is, the components in the electrical-equipment accommodating chamber are cooled by the cooling air having a relatively low temperature.

According to a second feature of the present invention, the partition wall extends vertically, and the draft bore is provided in a lower portion of the vertically extending partition wall. With this arrangement, because the partition wall extends vertically, the temperature of the partition wall itself is suppressed to be lower relative to a partition wall that vertically partitions the inside of the case so that the amount of heat transmitted through the partition wall to the electrical-equipment accommodating chamber is decreased. Therefore, it is easy to appropriately maintain the surrounding temperature in the electrical-equipment accommodating chamber.

According to a third feature of the present invention, at least the engine of the engine and working machine driven by the engine is supported on a bottom of the case with buffer members interposed therebetween, and the assist fan is mounted to the partition wall so that it blows the air within the electrical-equipment accommodating chamber toward the buffer members. With this arrangement, the air from the assist fan, which is operated in response to the temperature in the working-machine accommodating chamber exceeding the predetermined value, is blown to the buffer members. As a result, it is easy to suppress the temperature of the buffer members which are liable to be thermally influenced within an acceptable temperature range.

According to a fourth feature of the present invention, the electrical-equipment accommodating chamber has a labyrinth-shaped intake passage defined therein for guiding the air from the cooling-air intake port to an upper portion of the electrical-equipment accommodating chamber and then guiding the air through the electrical-equipment accommodating chamber to the draft bore. With this arrangement, a wall which defines the labyrinth-shaped intake passage suppresses the radiation of operational nose from the working-machine accommodating chamber through the electrical-equipment accommodating chamber to the outside by cooperating with the partition wall. The intake passage effectively dispenses the cooling air to the components in the electrical-equipment accommodating chamber and also functions as an intake silencer chamber. Moreover, rainwater is prevented from entering through the cooling-air intake port into the electrical-equipment accommodating chamber by the intake passage.

According to a fifth feature of the present invention, there is provided an engine operated machine system including an engine, a working machine driven by the engine, and a waste-heat recovery unit for recovering the waste heat of the engine. The components of the engine operated machine system are accommodated in a box-shaped case. The box-shaped case is provided with a partition wall that extends vertically to partition the inside of the box-shaped case into a working-machine accommodating chamber that accommodates the engine, the working machine and the waste-heat recovery unit, and an electrical-equipment accommodating chamber. The partition wall has a draft bore which connects the working-machine accommodating chamber to the electrical-equipment accommodating chamber at a lower portion of the partition wall. The case is also provided with a cooling-air intake port connecting the electrical-equipment accommodating chamber to the outside or atmosphere, and a discharge port forcibly discharging, to the outside, air discharged from the working-machine accommodating chamber by a fan driven by the engine. The electrical-equipment accommodating chamber has a labyrinth-shaped intake passage defined therein for guiding the air from the cooling-air intake port to an upper portion of the electrical-equipment accommodating chamber and then guiding the air to the draft bore.

With the arrangement of the above-described feature, an amount of air that is forcibly discharged by the fan driven by the engine flows from the electrical-equipment accommodating chamber into the working-machine accommodating chamber. As a result, the air flows such that the temperatures of the engine and a generator do not rise excessively. In addition, the cooling air flows through the electrical-equipment accommodating chamber into the working-machine accommodating chamber, that is, the components in the electrical-equipment accommodating chamber are cooled by the cooling air having a relatively low temperature. Further, the air having a temperature that is moderately raised as a result of being passed through the electrical-equipment accommodating chamber is supplied into the working-machine accommodating chamber. As a result, the temperature around the waste-heat recovery unit is not excessively lowered, thereby enhancing the efficiency of waste heat energy recovery. Moreover, the partition wall extends vertically and therefore, the temperature of the partition wall itself is suppressed to be low relative to a partition wall that vertically partitions the inside of the case, and the amount of heat transmitted through the partition wall to the electrical-equipment accommodating chamber is minimal. Therefore, it is easy to appropriately maintain the surrounding temperature in the electrical-equipment accommodating chamber. A wall defining the labyrinth-shaped intake passage functions to suppress the radiation of operational noise from the working-machine accommodating chamber through the electrical-equipment accommodating chamber to the outside by cooperating with the partition wall. Also, the intake passage itself effectively dispenses the cooling air to the components in the electrical-equipment accommodating chamber to cool the components, and functions as an intake silencer chamber. Further, rainwater is prevented from entering through the cooling-air intake port into the electrical-equipment accommodating chamber by the intake passage.

According to a sixth feature of the present invention, electrical equipment accommodated in the electrical-equipment accommodating chamber is mounted, in a vertical arrangement, to the partition wall in such a manner that the electrical equipment which generates a relatively large amount of heat is located in a lower position of the partition wall. With this arrangement, the air flowing through the electrical-equipment accommodating chamber finally cools the electrical equipment generating the relatively large amount of heat and then flows to the working-machine accommodating chamber. As a result, the cooling air is appropriately dispensed to the electrical equipment within the electrical-equipment accommodating chamber to appropriately cool the electrical equipment.

According to a seventh feature of the present invention, a vertically extending narrow passage section is defined in the middle of the intake passage. Also, a comb tooth-shaped heat-radiating plate is provided in the electrical equipment that generates the relatively large amount of heat and protrudes into the narrow passage section with a plurality of vertically extending passage portions therebetween. With this arrangement, most of the cooling air flowing to the working-machine accommodating chamber is blown to the heat-radiating plate, thereby effectively cooling the electrical equipment which generates the relatively large amount of heat. The transmission of the heat from the electrical equipment to the case is also inhibited.

According to an eighth feature of the present invention, an assist fan is disposed in the draft bore and is adapted to be operated, in response to the temperature in a lower portion of the working-machine accommodating chamber exceeding a predetermined value, to feed the air in the electrical-equipment accommodating chamber into the working-machine accommodating chamber. With this arrangement, when the temperature in a lower portion of the working-machine accommodating chamber is equal to or lower than the predetermined value, the assist fan disposed in the draft bore is not operated and functions as a draft resistance. As a result, an excessive amount of air does not flow from the electrical-equipment accommodating chamber into the working-machine accommodating chamber. Also, the amount of air that is forcibly discharged by the fan driven by the engine only flows from the electrical-equipment accommodating chamber into the working-machine accommodating chamber. Accordingly, the temperature in the working-machine accommodating chamber is prevented from being excessively lowered. Only when the temperature in the lower portion of the working-machine accommodating chamber exceeds the predetermined value does the assist fan feed the cooling air into the working-machine accommodating chamber, thereby preventing the temperature in the working-machine accommodating chamber from being excessively raised.

According to a ninth feature of the present invention, at least the engine of the engine and working machine is supported on a bottom of the case with buffer members interposed therebetween. Also, the assist fan is mounted to the partition wall so that the assist fan blows the air within the electrical-equipment accommodating chamber toward the buffer members. With this arrangement, the air from the assist fan that is operated in response to the temperature in a lower portion of the working-machine accommodating chamber exceeding the predetermined value is blown to the buffer members. As a result, it is easy to suppress the temperature of the buffer members, which are made of a mount rubber or the like and are liable to be thermally influenced to within an acceptable temperature range.

The above and other objects, features and advantages of the invention will become apparent from the following description of the preferred embodiment taken in conjunction with the accompanying drawings.

DESCRIPTION OF THE PREFERRED EMBODIMENT

The present invention will now be described by way of an embodiment with reference to FIGS. 1 to 5.

Figure 1:
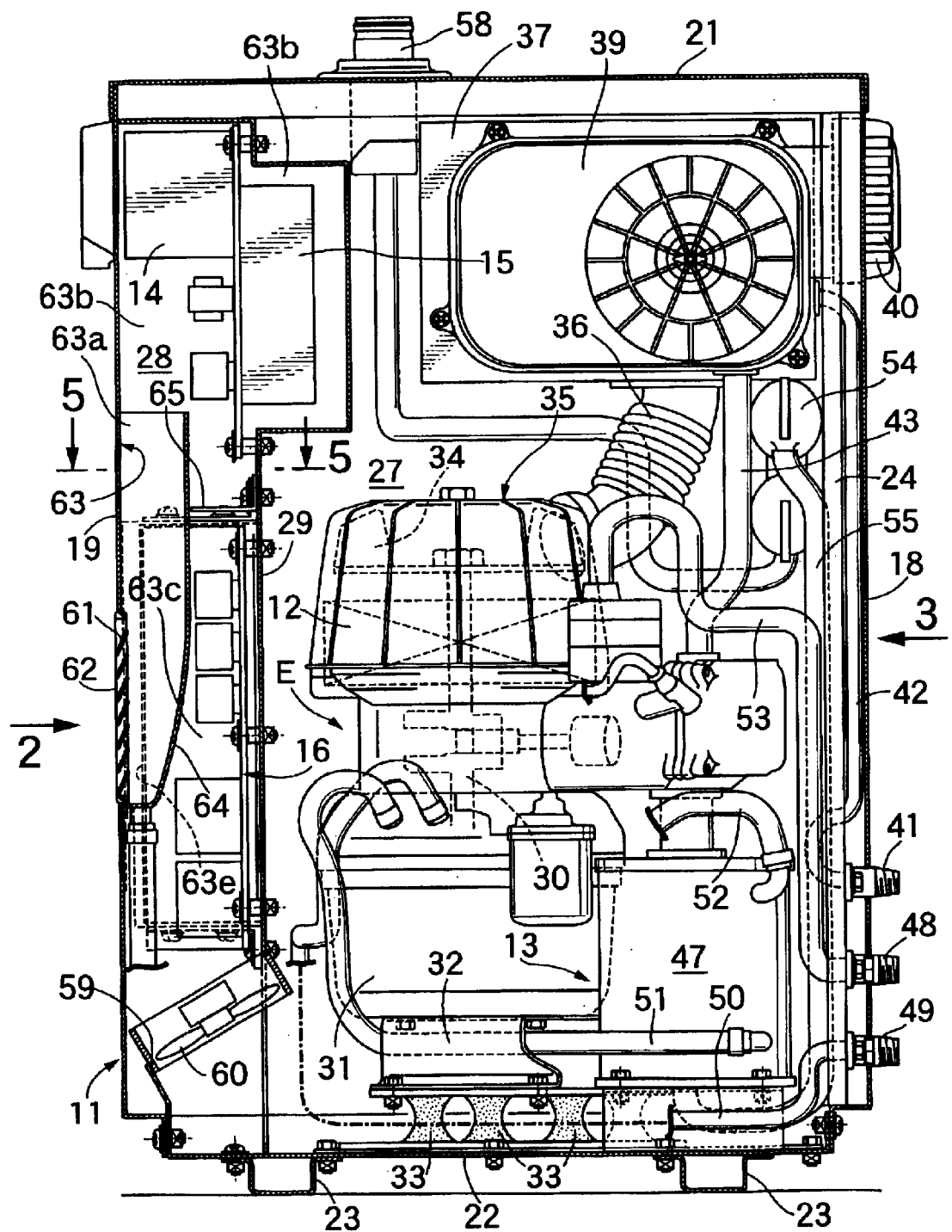
FIG. 1 is a vertical cross-sectional front view of the cogeneration system according to a preferred embodiment of the present invention, taken along line 1—1 in FIG. 2.
Figure 2:
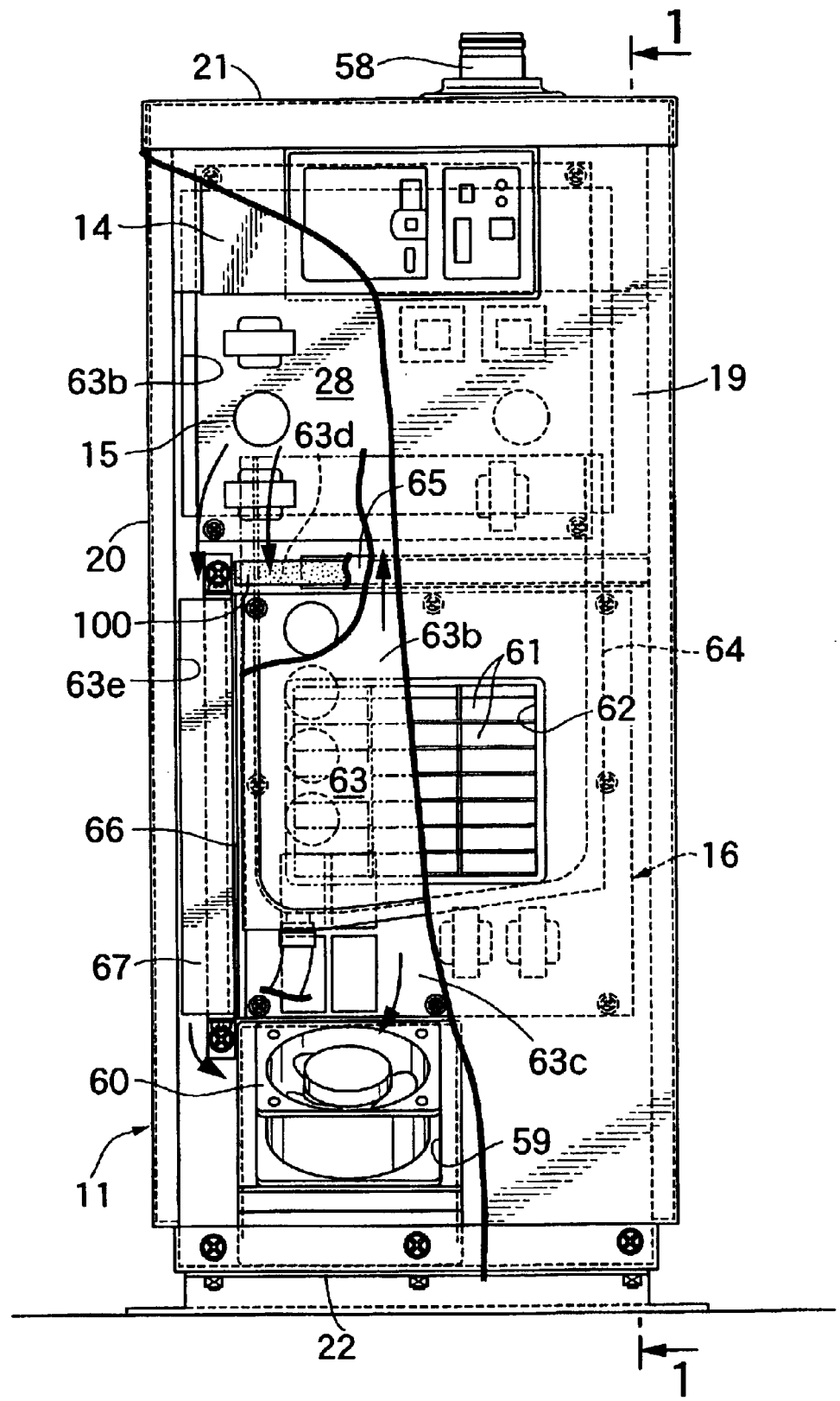
FIG. 2 is a partially cutaway left side view of the cogeneration system, taken in a direction of arrow 2 in FIG. 1.
Figure 3:
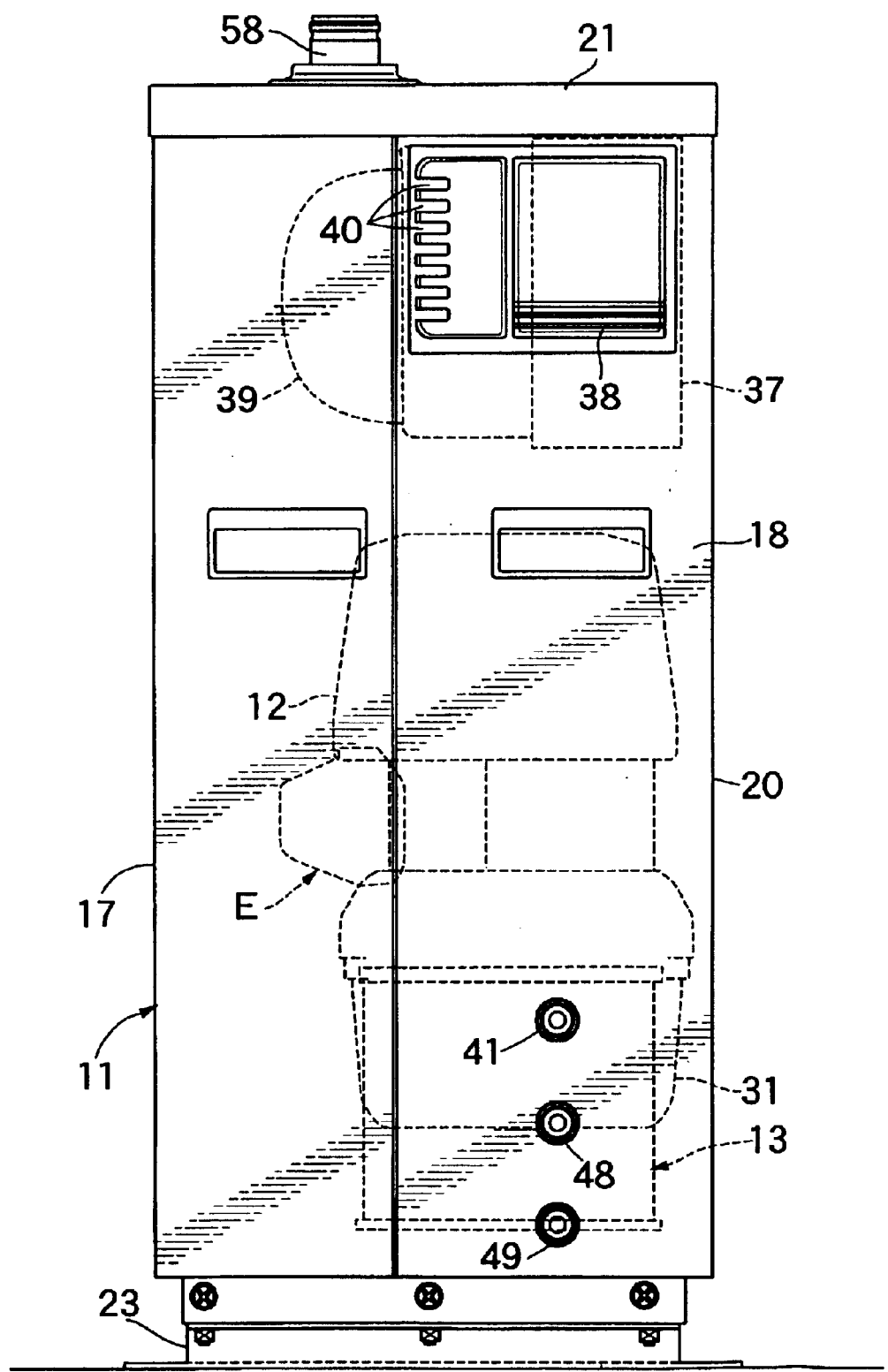
FIG. 3 is a right side view of the cogeneration system, taken in a direction of arrow 3 in FIG. 1.

Referring to FIGS. 1 to 3, a cogeneration system as an engine working machine includes a box-shaped case 11, which accommodates such devices as an engine E; a generator 12, which is a working machine driven by the engine E; a waste-heat recovery unit 13 for recovering waste heat from the engine E; an electronic control unit 14; a controlling power source unit 15; and an inverter unit 16 which are electrical components.

The case 11 is formed to have a box shape by fastening together a front panel 17, a right panel 18, a left panel 19, a back panel 20, a ceiling panel 21, and a bottom panel 22. A pair of leg members 23, 23 extending in a direction parallel to the right and left panels 18 and 19 are fastened to a lower surface of the bottom panel 22.

The front panel 17 is formed to have a substantially L-shaped cross section in such a manner that the panel 17 forms a portion of a front surface and a portion of a right side of the case 11. The right side of the case 11 is formed by a portion of the front panel 17 and the right panel 18. Joint portions of the front panel 17 and the right panel 18 are fastened to a support frame 24 vertically mounted between the bottom panel 22 and the ceiling panel 21.

The left panel 19 is formed to have a substantially L-shaped cross section in such a manner that the panel 19 forms a portion of the front surface and a left side of the case 11. The front surface of the case 11 is formed by the remaining portion of the front panel 17 and a portion of the left panel 19.

The case 11 is provided with a partition wall 29 which extends vertically to partition the inside of the case into a working-machine accommodating chamber 27, which accommodates the engine E, the generator 12, the waste-heat recovery unit 13 and the like, and an electrical-equipment accommodating chamber 28, which accommodates the electronic control unit 14, the controlling power source unit 15, the inverter unit 16, and the like. Joint portions of the front panel 17 and the left panel 19 are supported at a side end of the partition wall 29.

The engine E is accommodated in the working-machine accommodating chamber 27 with an axis of a crankshaft 30 disposed in a vertical direction. An oil pan 31 at a lower portion of the engine E is fixed on an engine mount bracket 32. The engine mount bracket 32 is supported on the bottom panel 22 of the case 11 with a plurality of buffer members 33 made of an elastic material, such as, for example, rubber, interposed therebetween.

The generator 12 is mounted on an upper portion of the engine E so that the rotor of the generator is connected to the crankshaft 30. At least the engine E, of the engine E and the generator 12 (both in the present embodiment), is supported on a bottom of the case 11 with the plurality buffer members 33 interposed therebetween.

A centrifugal fan 35 is mounted on the generator 12 and has blades 34 connected to the crankshaft 30, so that the blades are driven by the engine E. The fan 35 sucks air into the working-machine accommodating chamber 27 to forcibly discharge the air to the outside of the case 11. More specifically, a bellows-shaped duct 36 connected to the fan 35 is connected to an inlet of a silencer 37 supported in the case 11 in such a manner that the silencer 37 is accommodated in the working-machine accommodating chamber 27 above the fan 35. An outlet of the silencer 37 is connected to a discharge port 38 provided in an upper portion of the right panel 18 of the case 11. Moreover, the discharge port 38 is defined to discharge the air downwards. Namely, the air forcibly discharged out of the working-machine accommodating chamber 27 by the fan 35 is discharged downwards from the discharge port 38 via the silencer 37 to the outside.

An air cleaner 39 is mounted to the silencer 37 above the fan 35 and a plurality of engine intake ports 40 are provided in an upper portion of the right panel 18 at vertical intervals in locations adjoining the discharge port 38.

A mixer (not shown) is provided in the air cleaner 39 so that fresh and purified air drawn through the engine intake ports 40, and a fuel gas introduced from a fuel gas connecting pipe 41 mounted on an a lower portion of the right panel 18 of the case 11 through a conduit 42, are mixed together by the mixer. An air-fuel mixture produced by the mixer is supplied to the engine E through an intake pipe 43.

Figure 4:
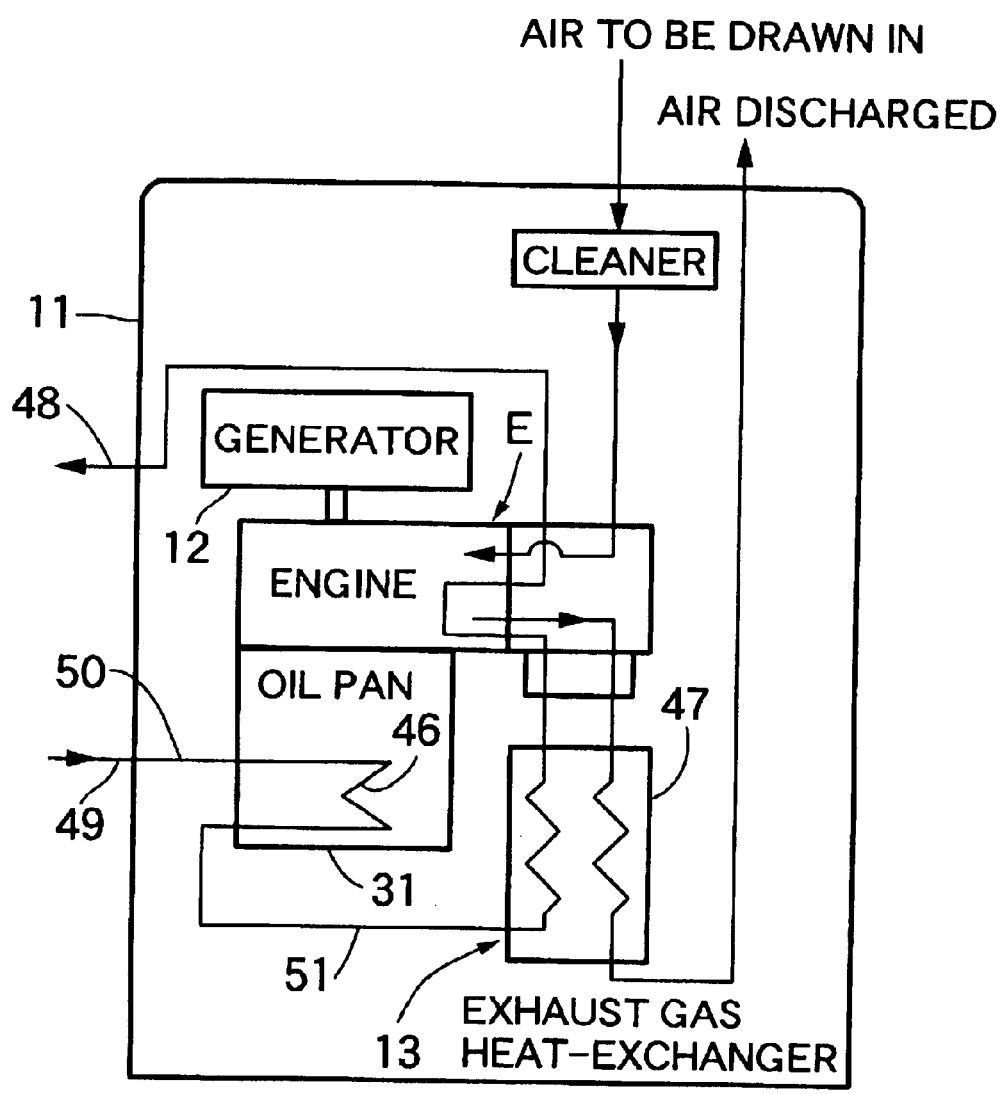
FIG. 4 is a schematic diagram showing a circuit arrangement of a section associated with the recovery of the waste heat of an engine.

Referring to FIG. 4, an oil cooler 46 is provided in the oil pan 31 in the engine E, and an exhaust gas heat-exchanger 47, which forms a portion of the waste-heat recovery unit 13 together with the oil cooler 46, is supported on the bottom panel 22 of the case 11 sideways of the oil pan 31.

A medium outlet connecting pipe 48 is mounted at a lower portion of the right panel 18 of the case 11 below the fuel gas connecting pipe 41. Further, a medium inlet connecting pipe 49 is mounted on the right panel 18 below the medium outlet connecting pipe 48. A conduit (not shown) for guiding water as a medium for recovering the waste heat of the engine E is connected from the outside to the medium inlet connecting pipe 49. The medium inlet connecting pipe 49 is connected to an inlet of the oil cooler 46 through a conduit 50. An outlet of the oil cooler 46 is connected to the exhaust gas heat-exchanger 47.

The exhaust gas heat exchanger 47 conducts the heat exchange between the water, which is a medium, and an exhaust gas from the engine E. The exhaust gas from the engine E flows downwards from the upper portion of the exhaust gas heat-exchanger 47. The water resulting from the heat exchange with the exhaust gas is discharged out of an upper portion of the exhaust gas heat-exchanger 47 and introduced into a water jacket within the engine E via a conduit 52. Namely, the waster-heat recovery unit 13 includes the water jacket, the oil cooler 46, and the exhaust gas heat-exchanger 47.

The water discharged from the water jacket of the waster-heat recovery unit 13 is guided through a conduit 53 to the medium outlet connecting pipe 48. Water heated to a high temperature by recovering the waste heat of the engine E is obtained from the medium outlet connecting pipe 48.

The exhaust gas discharged from a lower portion of the exhaust gas heat-exchanger 47 is guided through an exhaust gas conduit 55 into a silencer 54 disposed below the air cleaner 39 and then released from an engine exhaust pipe 58 to the outside. The engine exhaust pipe 58 is mounted on the ceiling panel 21 of the case 11 in such a manner that the engine exhaust pipe releases the exhaust gas upwards.

The partition wall 29, which partitions the inside of the case 11 into the working-machine accommodating chamber 27 and the electrical-equipment accommodating chamber 28, has a draft bore 59 provided in a lower portion thereof to connect the working-machine accommodating chamber 27 to the electrical-equipment accommodating chamber 28. An assist fan 60 is disposed in the draft bore 59, and operated, in response to the temperature within the working-machine accommodating chamber 27 exceeding a predetermined value, to feed the air in the electrical-equipment accommodating chamber 28 into the working-machine accommodating chamber 27.

Moreover, the assist fan 60 is mounted to the partition wall 29 in such a manner that the assist fan blows the air within the electrical-equipment accommodating chamber 28 toward the plurality of buffer members 33 mounted between the bottom panel 22 of the case 11 and the engine E. In the present embodiment, the assist fan 60 is disposed in the draft bore 59 that is inclined downwards relative to the working-machine accommodating chamber 27.

Figure 5:
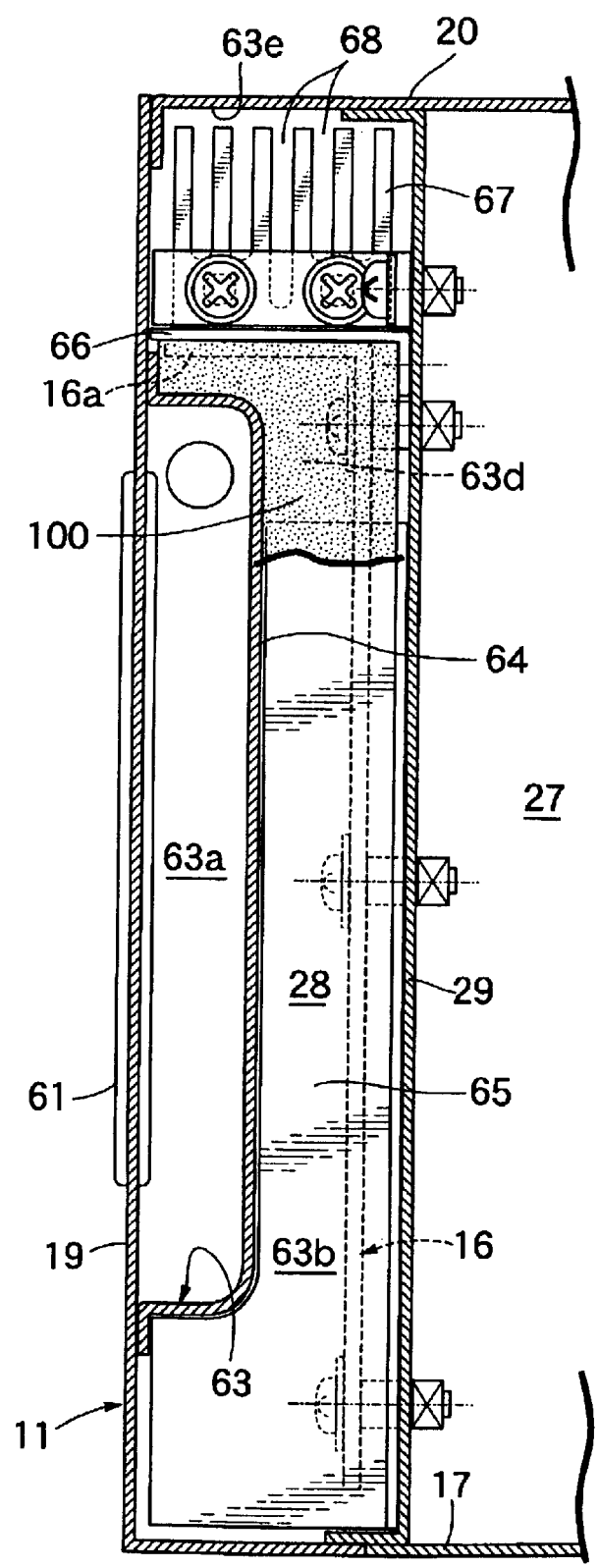
FIG. 5 is an enlarged sectional view taken along line 5—5 in FIG. 1.

Referring to FIG. 5, the left panel 19 of the case 11 is provided with a cooling-air intake port 62 in which a plurality of louvers 61 are arranged at vertical intervals such that the louvers are inclined downwards to face toward the outside. The electrical-equipment accommodating chamber 28 has a labyrinth-shaped intake passage 63 defined therein through which the air from the cooling-air intake port 62 is guided into an upper portion of the electrical-equipment accommodating chamber 28 and then supplied into the electrical-equipment accommodating chamber 28.

The electronic control unit 14, the controlling power source unit 15, and the inverter unit 16 accommodated in the electrical-equipment accommodating chamber 28 are mounted in a vertical arrangement to a side of the partition wall 29 adjacent the electrical-equipment accommodating chamber 28, so that the inverter unit 16, which generates a large amount of heat, is in a lower position relative to the other mounted components. The labyrinth-shaped intake passage 63 is defined by a passage-defining member 64 mounted to an inner surface of the left panel 19 at a location substantially corresponding to the inverter unit 16, a baffle plate 65 secured to the partition wall 29 so as to extend between the passage-defining member 64 and the partition wall 29 above the inverter unit 16, and a vertically extending partition plate 66 mounted to the partition wall 29 so as to lead to one side of a base plate 16a of the inverter unit 16.

The labyrinth-shaped intake passage 63 includes an ascending passage section 63a defined between the left panel 19 and the passage-defining member 64 with a lower portion leading to the cooling-air intake passage 62. Also, an upper passage section 63b of the labyrinth-shaped intake passage 63 is defined above the baffle plate 65 and occupies an area where the electronic control unit 14 and the controlling power source unit 15 in the electrical-equipment accommodating chamber 28 are disposed. Furthermore, a descending passage section 63c of the labyrinth-shaped intake passage 63 is defined between the partition wall 29 and the passage-defining member 64 below the baffle plate 65 to lead to the draft bore 59. A constricting passage section 63d of the labyrinth-shaped intake passage 63 is defined by providing an air-permeable seal member 100 in a clearance between the baffle plate 65 and the passage-defining member 64 so as to connect the upper passage section 63b and the descending passage section 63c to each other. Finally, a narrow passage section 63e of the labyrinth-shaped intake passage 63 is defined between the partition plate 66 and the back panel 20 with an upper end that leads to the upper passage section 63b and a lower end that leads to the draft bore 59.

The air introduced through the cooling-air intake port 62 flows upwards through the ascending passage section 63a to the upper passage section 63b. Thereafter, a portion of the air is dispensed to the descending passage section 63c and most of the remaining air is dispensed to the narrow passage section 63e, whereby the air flows downwards to the draft bore 59. Thus, the electronic control unit 14, the controlling power source unit 15, and the inverter unit 16 are cooled by the air flowing through the intake passage 63.

A comb tooth-shaped heat-radiating plate 67 is mounted on the base plate 16a of the inverter unit 16, which generates the relatively large amount of heat, so as to protrude into the narrow passage section 63e with a plurality of vertically extending passage portions 68 defined therebetween.

The operation of this embodiment will be described below.

Provided in the case 11 is the partition wall 29, which partitions the inside of the case 11 into the working-machine accommodating chamber 27 that accommodates the engine E, the generator 12 and the waste-heat recovery unit 13, and the electrical-equipment accommodating chamber 28. The partition wall 29 has the draft bore 59, which connects the working-machine accommodating chamber 27 to the electrical-equipment accommodating chamber 28. The case 11 is also provided with the cooling-air intake port 62 connecting the electrical-equipment accommodating chamber 28 to the outside or atmosphere, and the discharge port 38 discharging, to the outside, the air forcibly discharged out of the electrical-equipment accommodating chamber 28 by the fan 35 driven by the engine E.

Therefore, an amount of the air forcibly discharged by the fan 35 flows from the electrical-equipment accommodating chamber 28 to the working-machine accommodating chamber 27. Accordingly, the air is caused to flow so that the temperatures in the engine E, the generator 12, and the waste-heat recovery unit 13 are not excessively raised. The air flows through the electrical-equipment accommodating chamber 28 to the working-machine accommodating chamber 27. That is, the electronic control unit 14, the controlling power source unit 15, the inverter unit 16, and the like in the electrical-equipment accommodating chamber 28 are cooled by the cooling air having a relatively low temperature. In addition, the air moderately heated as a result of passing through the electrical-equipment accommodating chamber 28 is supplied into the working-machine accommodating chamber 27. As a result, the temperature around the waste-heat recover unit 13 is not excessively lowered, which enhances the recovery efficiency of the waste heat energy.

Moreover, the electronic control unit 14, the controlling power source unit 15, and the inverter unit 16 in the electrical-equipment accommodating chamber 28 are mounted in the vertical arrangement to the partition wall 29 in such a manner that the inverter unit 16, which generates a relatively large amount of heat, is in the lower position. Therefore, the air flowing through the electrical-equipment accommodating chamber 28 ultimately cools the inverter unit 16, which generates the relatively large amount of heat, and flows toward the working-machine accommodating chamber 27. As a result, the cooling air 16 is appropriately dispensed to the electronic control unit 14, the controlling power source unit 15, and the inverter unit 16 in the electrical-equipment accommodating chamber 28.

Additionally, since the partition wall 29 extends vertically, the temperature of the partition wall 29 itself is suppressed to be relatively low, as compared with a partition wall which vertically partitions the inside of the case 11. As a result, the heat amount transmitted through the partition wall 29 to the electrical-equipment accommodating chamber 28 is decreased and hence, the temperature conditions of the electronic control unit 14, the controlling power source unit 15, the inverter unit 16, and the like in the electrical-equipment accommodating chamber 28 are appropriately maintained.

The assist fan 60, which is operated in response to the temperature in the lower portion of the working-machine accommodating chamber 27 exceeding the predetermined value, feeds the air within the electrical-equipment accommodating chamber 28 into the working-machine accommodating chamber 27. The assist fan 60 is disposed in the draft bore 59 so that when the temperature in the working-machine accommodating chamber 27 is equal to or lower than the predetermined value, the assist fan 60 is not operated and functions as a draft resistance. Thus, an excessive amount of air cannot flow from the electrical-equipment accommodating chamber 28 into the working-machine accommodating chamber 27, and the amount of the air forcibly discharged by the fan 35 driven by the engine E only flows from the electrical-equipment accommodating chamber 28 into the working-machine accommodating chamber 27. Therefore, the temperature in the working-machine accommodating chamber 27 is not excessively lowered, thereby enhancing the recovery efficiency of the waste heat energy. When the temperature in the working-machine accommodating chamber 27 exceeds the predetermined value, the assist fan 60 feeds the cooling air into the working-machine accommodating chamber 27, thereby preventing the temperature in the working-machine accommodating chamber 27 from being excessively raised.

In addition, at least the engine E of the engine E and the generator 12 is supported on the bottom of the case 11 with the buffer members 33 interposed therebetween. Also, the assist fan 60 is mounted to the partition wall 29 in such a manner that the fan blows the air in the electrical-equipment accommodating chamber 28 toward the buffer members 33. Therefore, the air from the assist fan 60, which is operated in response to the temperature in the lower portion of the working-machine accommodating chamber 27 exceeding the predetermined value, is blown to the buffer members 33. Accordingly, the temperature of the buffer members 33, which are made of the elastic material, such as, for example, a mount rubber that is liable to be thermally influenced, is easily suppressed within an acceptable temperature range.

Further, the labyrinth-shaped intake passage 63 which guides the air from the cooling-air intake port 62 to the upper portion of the electrical-equipment accommodating chamber 28, and then guides the air through the electrical-equipment accommodating chamber 28 into the draft bore 59, is defined in the electrical-equipment accommodating chamber 28. The passage-defining member 64, which is a wall defining the labyrinth-shaped intake passage 63, functions to inhibit radiation of operational noise within the working-machine accommodating chamber 27 from the side of the electrical-equipment accommodating chamber 28 to the outside by cooperating with the partition wall 29. Further, the intake passage 63 itself dispenses the cooling air to the electronic control unit 14, the controlling power source unit 15 and the inverter unit 16 in the electrical-equipment accommodating chamber 28 to cool the components, and also functions as an intake silencer chamber.

Moreover, rainwater is prevented from entering through the cooling-air intake port 62 into the electrical-equipment accommodating chamber 28 via the intake passage 63.

The vertically extending narrow passage section 63e is defined by the middle of the labyrinth-shaped intake passage 63. The cooling air flowing through the labyrinth-shaped intake passage 63 is constricted by the constricting passage section 63d, wherein a small amount of the air merely flows toward the descending passage section 63c, and most of the cooling air flows through the narrow passage section 63e. Since the comb tooth-shaped heat-radiating plate 67 included in the inverter unit 16, which generates the relatively larger amount of heat, protrudes into the narrow passage section 63e with the plurality of passage portions 68 defined therebetween, most of the cooling air is blown to the heat-radiating plate 67 of the inverter unit 16 generating the larger amount of heat, thereby effectively cooling the inverter unit 16. In addition, the transmission of heat from the inverter unit 16 to the case 11 is suppressed.

Although the embodiment of the present invention has been described in detail, it will be understood that the present invention is not limited to the above-described embodiment, and various modifications in design may be made without departing from the spirit and scope of the invention defined in the claims.

For example, the cogeneration system including the working machine driven by the engine as the generator, has been described in the embodiment, but the present invention may be carried out widely in connection with an engine operated machine system including an engine, a working machine driven by the engine, and a waste-heat recovery unit for recovering the waste heat of the engine, which are each accommodated in a box-shaped case.

The rotational speed of the assist fan 60 may be variably controlled to regulate of the temperature. Further, the blowing-out direction of the air through the assist fan 60 may be varied so that the components that are needed to be cooled are cooled in addition to the buffer members.

What is claimed is:

1. An engine operated machine system comprising:
   an engine;
   a working machine driven by said engine; and
   a waste-heat recovery unit that recovers waste heat emitted by said engine, wherein said engine, said working machine, and said waste-heat recovery unit are accommodated in a box-shaped case,
   wherein said box-shaped case comprises:
      a partition wall which partitions an interior of said case into a working-machine accommodating chamber, which accommodates said engine, said working machine and said waste-heat recovery unit, and an electrical-equipment accommodating chamber; the partition wall having a draft bore which connects said working-machine accommodating chamber to said electrical-equipment accommodating chamber;
      a cooling-air intake port which connects said electrical-equipment accommodating chamber to the outside; and
      a discharge port for discharging, to the outside, air forcibly discharged from said working-machine accommodating chamber by a fan driven by said engine, and
   wherein an assist fan is disposed in said draft bore and is adapted to be operated, in response to a temperature in said working-machine accommodating chamber exceeding a predetermined value, to feed the air in said electrical-equipment accommodating chamber into said working-machine accommodating chamber.

2. The engine operated machine system according to claim 1, wherein said partition wall extends vertically, and said draft bore is provided in a lower portion of said vertically extending partition wall.

3. The engine operated machine system according to claim 2, wherein at least said engine and said working machine are supported on a bottom of said box-shaped case with buffer members interposed therebetween, and said assist fan is mounted to said partition wall to blow the air within said electrical-equipment accommodating chamber toward said buffer members.

4. The engine operated machine system according to claim 2, wherein said electrical-equipment accommodating chamber has a labyrinth-shaped intake passage defined therein to guide the air from said cooling-air intake port to an upper portion of said electrical-equipment accommodating chamber and then guide the air through said electrical-equipment accommodating chamber to said draft bore.

5. The engine operated machine system according to claim 3, wherein said electrical-equipment accommodating chamber has a labyrinth-shaped intake passage defined therein to guide the air from said cooling-air intake port to an upper portion of said electrical-equipment accommodating chamber and then guide the air through said electrical-equipment accommodating chamber to said draft bore.

6. An engine operated machine system comprising:
   an engine;
   a working machine driven by said engine; and
   a waste-heat recovery unit that recovers waste heat emitted by said engine, wherein said engine, said working machine, and said waste-heat recovery unit are accommodated in a box-shaped case,
   wherein said box-shaped case comprises:
      a partition wall which extends vertically relative to a bottom surface of said box-shaped case to partition an interior of said case into a working-machine accommodating chamber, which accommodates said engine, said working machine and said waste-heat recovery unit, and an electrical-equipment accommodating chamber; the partition wall having a draft bore which connects said working-machine accommodating chamber to said electrical-equipment accommodating chamber at a lower portion of the partition wall;
      a cooling-air intake port which connects said electrical-equipment accommodating chamber to the outside; and
      a discharge port for discharging, to the outside, air forcibly discharged from said working-machine accommodating chamber by a fan driven by said engine,
   wherein said electrical-equipment accommodating chamber has a labyrinth-shaped intake passage defined therein for guiding the air from said cooling-air intake port to an upper portion of said electrical-equipment accommodating chamber and then guides the air to said draft bore, and
   a plurality of electrical components accommodated in said electrical-equipment accommodating chamber are mounted in a vertical arrangement to said partition wall.

7. The engine operated machine system according to claim 6, wherein the electrical component which generates a relatively large amount of heat is in a relatively lower position on said partition wall.

8. The engine operated machine system according to claim 7, wherein said intake passage has a vertically extending narrow passage section defined in a middle thereof, and a comb tooth-shaped heat-radiating plate is provided in said electrical component which generates the relatively large amount of heat, to protrude into said narrow passage section with a plurality of vertically extending passage portions therebetween.

9. The engine operated machine system according to claim 6, further including an assist fan which is disposed in said draft bore and adapted to be operated, in response to a temperature in a lower portion of said working-machine accommodating chamber exceeding a predetermined value, to feed the air in said electrical-equipment accommodating chamber into said working-machine accommodating chamber.

10. The engine operated machine system according to claim 9, wherein at least said engine and said working machine are supported on a bottom of said box-shaped case with buffer members interposed therebetween, and said assist fan is mounted to said partition wall so that said assist fan blows the air within said electrical-equipment accommodating chamber toward said buffer members.

* * * * *